(12) United States Patent
Zhao et al.

(10) Patent No.: US 11,930,078 B2
(45) Date of Patent: Mar. 12, 2024

(54) EVENT SUBSCRIPTION NOTIFICATION METHOD, NETWORK SIDE DEVICE, APPLICATION ENTITY, INTERNET OF THINGS SYSTEM, AND STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Qian Zhang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/422,008

(22) PCT Filed: Jan. 14, 2020

(86) PCT No.: PCT/CN2020/071897
§ 371 (c)(1),
(2) Date: Jul. 9, 2021

(87) PCT Pub. No.: WO2020/147700
PCT Pub. Date: Jul. 23, 2020

(65) Prior Publication Data
US 2022/0103635 A1    Mar. 31, 2022

(30) Foreign Application Priority Data

Jan. 14, 2019 (CN) .......................... 201910032326.5

(51) Int. Cl.
*H04L 67/12* (2022.01)
*H04L 67/55* (2022.01)

(52) U.S. Cl.
CPC .............. *H04L 67/12* (2013.01); *H04L 67/55* (2022.05)

(58) Field of Classification Search
None
See application file for complete search history.

(56) References Cited

U.S. PATENT DOCUMENTS

| 2004/0002972 A1* | 1/2004 | Pather | ..................... H04L 67/55 |
| 2012/0016833 A1* | 1/2012 | Janiesch | .............. G06Q 10/067 |
| | | | 706/50 |

(Continued)

FOREIGN PATENT DOCUMENTS

| CN | 105872075 A | 8/2016 |
| CN | 106797392 A | 5/2017 |

(Continued)

OTHER PUBLICATIONS

International Search Report and Written Opinion for Application No. PCT/CN2020/071897, dated Apr. 3, 2020, 8 Pages.

(Continued)

*Primary Examiner* — Chris Parry
*Assistant Examiner* — Abderrahmen Chouat
(74) *Attorney, Agent, or Firm* — Brooks Kushman P.C.

(57) ABSTRACT

An event subscription notification method, including: creating a subscription resource, the subscription resource including an event notification rule; determining whether subscribed data meets the event notification rule; and when the subscribed data meets the event notification rule, generating an event notification.

18 Claims, 6 Drawing Sheets

(56) References Cited

U.S. PATENT DOCUMENTS

| | | | |
|---|---|---|---|
| 2015/0134252 A1* | 5/2015 | Marshall | G01W 1/16 |
| | | | 702/4 |
| 2017/0208139 A1 | 7/2017 | Li et al. | |
| 2017/0270490 A1* | 9/2017 | Penilla | G07C 5/006 |
| 2018/0217570 A1 | 8/2018 | Shah | |
| 2019/0273790 A1 | 9/2019 | Zhao | |
| 2019/0357026 A1 | 11/2019 | Hwang et al. | |
| 2021/0152653 A1 | 5/2021 | Guo et al. | |

FOREIGN PATENT DOCUMENTS

| | | | | |
|---|---|---|---|---|
| CN | 106973118 A | 7/2017 | | |
| CN | 107666432 A | 2/2018 | | |
| CN | 107968805 A | 4/2018 | | |
| WO | WO-2015154459 A1 * | 10/2015 | | H04W 8/18 |
| WO | 2018128205 A1 | 7/2018 | | |

OTHER PUBLICATIONS

First Office Action for Indian Application No. 202127035904, dated Feb. 15, 2023, 5 Pages (including English Translation).

* cited by examiner

US 11,930,078 B2

EVENT SUBSCRIPTION NOTIFICATION METHOD, NETWORK SIDE DEVICE, APPLICATION ENTITY, INTERNET OF THINGS SYSTEM, AND STORAGE MEDIUM

CROSS-REFERENCE TO RELATED APPLICATION APPLICATIONS

This application is the U.S. national phase of PCT Application No. PCT/CN2020/071897 filed on Jan. 14, 2020, which claims priority to Chinese Patent Application No. 201910032326.5 filed on Jan. 14, 2019, which are incorporated herein by reference in their entireties.

TECHNICAL FIELD

The present disclosure relates to the field of Internet of Things (IoT), in particular to an event subscription notification method, a network side device and an application entity for implementing the event subscription notification method, an IoT system including a server, and a computer-readable storage medium.

BACKGROUND

Along with the development of the network technology, an IoT system has already emerged. However, a small amount of information is carried in data provided by a public service entity in the IoT system, so an application scenario of the data is limited.

SUMMARY

In a first aspect, the present disclosure provides in some embodiments an event subscription notification method for a network side device, including: creating a subscription resource, the subscription resource including an event notification rule; determining whether subscribed data meets the event notification rule; and when the subscribed data meets the event notification rule, generating an event notification.

In a second aspect, the present disclosure provides in some embodiments an event subscription notification method for an application entity, including: determining an event notification rule; transmitting a subscription request to a network side device, the subscription request including the event notification rule; and receiving an event notification returned by the network side device in response to the subscription request.

In a third aspect, the present disclosure provides in some embodiments a network side device, including: a resource creation circuitry configured to create a subscription resource, the subscription resource including an event notification rule; a determination circuitry configured to determine whether subscribed data meets the event notification rule; and an event generation circuitry configured to, when the determination circuitry determines that the subscribed data meets the event notification rule, generate an event notification.

In a fourth aspect, the present disclosure provides in some embodiments an application entity, including: a determination circuitry configured to determine an event notification rule; a transmission circuitry configured to transmit a subscription request to a network side device, the subscription request including the event notification rule; and a reception circuitry configured to receive an event notification returned by the network side device in response to the subscription request.

In a fifth aspect, the present disclosure provides in some embodiments an IoT system, including the above-mentioned network side device, the above-mentioned application entity, and at least one IoT device. The IoT device and the application entity are in communication with the network side device.

In a sixth aspect, the present disclosure provides in some embodiments a computer-readable storage medium storing therein an instruction for implementing the above-mentioned event subscription notification method.

DETAILED DESCRIPTION

The present disclosure will be described hereinafter in conjunction with the drawings and embodiments. The following embodiments are for illustrative purposes only, but shall not be used to limit the scope of the present disclosure.

Figure 1:
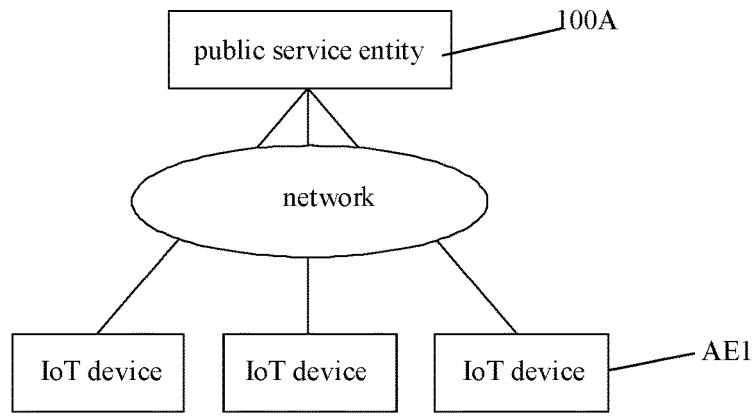
FIG. 1 is a schematic view showing a conventional IoT system.

FIG. 1 shows a conventional IoT system. As shown in FIG. 1, the IoT system includes a public service entity 100A and an IoT device AE1 coupled to the public service entity 100A via a wireless network. On one hand, the IoT device AE1 reports, in real time, real-time information collected by the IoT device AE1, and the public service entity 100A stores data uploaded by the IoT device AE1, e.g., the real-time information, and provides data support for a corresponding application. On the other hand, the IoT device AE1 receives instructions and data issued by the public service entity 100A, so as to achieve such functions as remote control and firmware updating.

Figure 2:
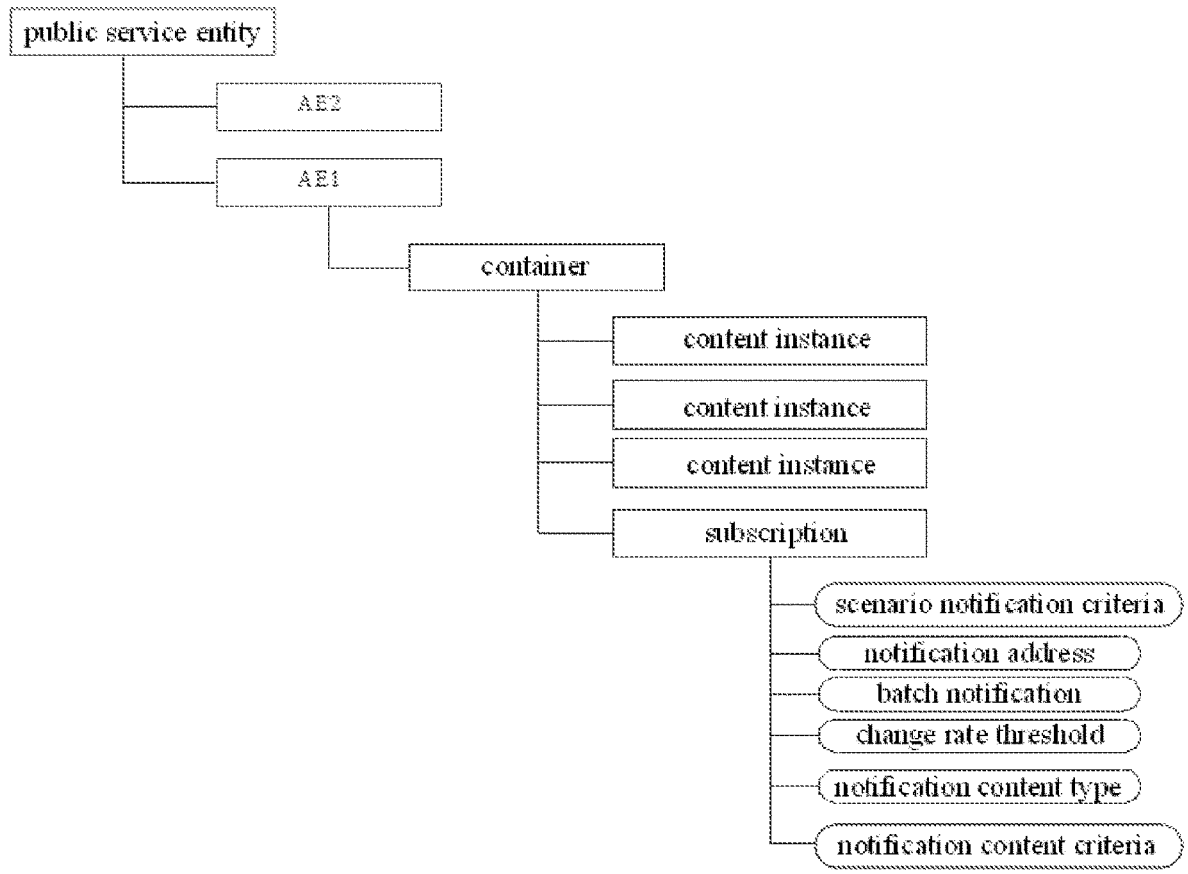
FIG. 2 is a schematic view showing the creation of resources in a conventional subscription method.

FIG. 2 shows a resource structure created in the public service entity. As shown in FIG. 2, resources for the IoT device AE1 and resources for an application entity AE2 are created in the public service entity, and a container resource is created in the resources for the application entity AE1. The container resource is used to store a content instance resource and a subscription resource. The subscription resource includes a scenario notification criteria attribute, a notification address attribute, a batch notification attribute, a change rate threshold attribute, a notification content type attribute, and a notification content criteria attribute.

However, in terms of the data currently received by the public service entity 100A, a small amount of information is carried in the data, so an application scenario of the data is limited.

Based on the above, the present disclosure provides in some embodiments an event subscription notification method, a network side device and an application entity for implementing the event subscription notification method, an IoT system including a server, and a computer-readable storage medium. In the event subscription notification method involved in the embodiments of the present disclosure, an event may be generated merely in the case that subscribed data meets an event notification rule, so it is able to classify the data in accordance with the generated event. In other words, it is able to increase the information carried in the subscribed data, thereby to spread the application scenario of the data.

In the embodiments of the present disclosure, the resources may represent a physical device, a logic device (e.g., an AE1 resource represents an application module), or a function (e.g., a container resource represents a container).

Figure 8:
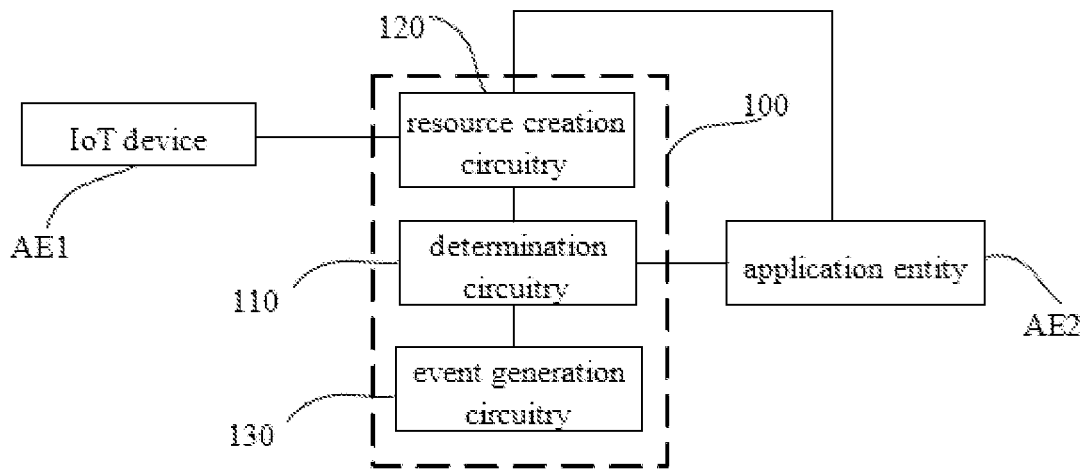
FIG. 8 is a schematic view showing an IoT system according to one embodiment of the present disclosure.

In a first aspect of the present disclosure, the present disclosure provides in some embodiments an event subscription notification method for an IoT system. As shown in FIG. 8, the IoT system may include a network side device 100 (e.g., a server, which is also called as a public service entity), an IoT device AE1 and an application entity AE2. The IoT device AE1 may be coupled to the network side device via a wireless network, and report, in real time, real-time information collected by the IoT device AE1 to the network side device. The network side device may store data uploaded by the IoT device AE1, e.g., the real-time information, and provide data support for a corresponding application. For example, the application entity AE2 may subscribe data to the network side device, e.g., the data uploaded by the IoT device AE1. When the IoT system is an Internet of Vehicle (IoV) system, the IoT device AE1 may be an IoV device mounted within a vehicle, and the data collected by the IoT device AE1 may be information such as speed, tire pressure and braking frequency.

Figure 3:
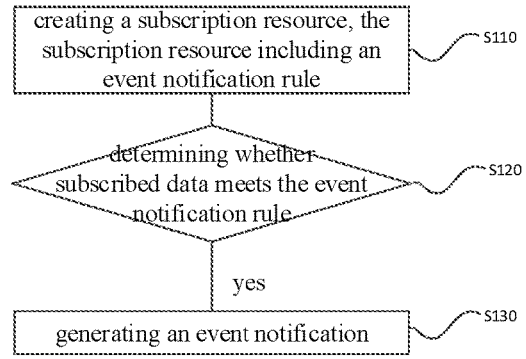
FIG. 3 is a flow chart of an event subscription notification method according to one embodiment of the present disclosure.

As shown in FIG. 3, the present disclosure provides in some embodiments an event subscription notification method for a network side device, which includes: Step S110 of creating a subscription resource, the subscription resource including an event notification rule; Step S120 of determining whether subscribed data meets the event notification rule; and Step S130 of, when the subscribed data meets the event notification rule, generating an event notification.

According to the event subscription notification method in the embodiments of the present disclosure, an event may be generated merely in the case that the subscribed data meets the event notification rule, so it is able to process the data in accordance with the generated event.

Figure 4:
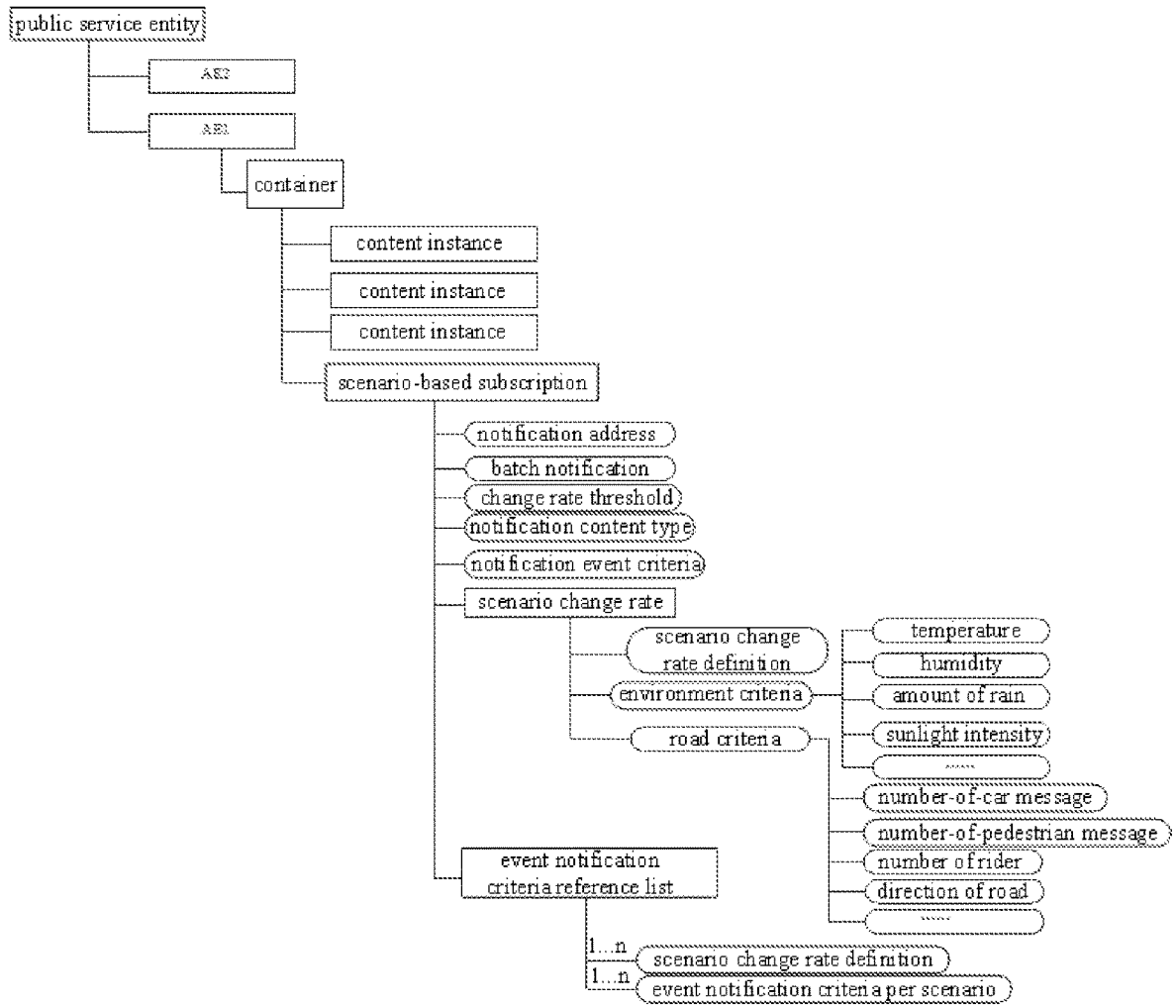
FIG. 4 is a schematic view showing the creation of resources in the event subscription notification method according to one embodiment of the present disclosure.

To be specific, in Step S110, the network side device may create the subscription resource upon the receipt of a subscription request from an application entity, e.g., an IoT device in an IoT system (a specific structure of the subscription resource is shown in FIG. 4, which will be further described hereinafter). The event notification rule may be pre-defined in the network side device, or acquired from the received subscription request.

In a mode where the event notification rule is acquired from the received subscription request, prior to Step S110, the event subscription notification method may further include receiving the subscription request from the application entity, and the subscription request may include the event notification rule defined by the application entity.

In the embodiments of the present disclosure, there is no special requirement on a specific content of the event notification rule, and the specific content of the event notification rule may be determined in accordance with a specific application scenario of the data. For example, the event notification rule may include one or more of a change rate event notification rule, an attribute change event notification rule, an operation monitoring event notification rule. The following description will be given by taking the change rate event notification rule as an example.

For a same parameter, when content information corresponding to the parameter changes greatly, it means that a scenario where a device generating the parameter is located has changed. In some embodiments of the present disclosure, in order to enable the subscribed data to carry scenario information, the event notification rule may include the change rate event notification rule. To be specific, the change rate event notification rule may include whether a change rate of content information about a received $N^{th}$ content instance relative to content information about at least one content instance in a first content instance to an $(N-1)^{th}$ content instance meets a predetermined threshold, where N is a variable and a natural number not smaller than 2.

Correspondingly, Step S120 of determining whether the subscribed data meets the event notification rule may specifically include: determining whether the change rate of the content information about the received $N^{th}$ content instance relative to the content information about the at least one content instance in the first content instance to the $(N-1)^{th}$ content instance meets the predetermined threshold; and when the change rate of the content information about the $N^{th}$ content instance relative to the content information about any content instance before the $N^{th}$ content instance meets the predetermined threshold, determining that the content information about the $N^{th}$ content instance meets the change rate event notification rule.

In the embodiments of the present disclosure, the predetermined threshold will not be particularly defined, and it may be determined through experiments. For example, when the IoT system is an IoV system and the IoT device is mounted in a vehicle, a change rate between a first driving speed of the vehicle in a scenario with sunshine but without any pedestrian and a second driving speed of the vehicle in a scenario with sunshine and pedestrians may be determined in accordance with the first driving speed and the second driving speed from the IoT device, and then the change rate may be determined as the predetermined threshold.

In some embodiments of the present disclosure, when the change rate meets the predetermined threshold, an absolute value of the change rate may be greater than the predetermined threshold and the change rate may be a positive change rate or a negative change rate, and/or the absolute value of the change rate may be smaller than the predetermined threshold and the change rate may be a positive change rate or a negative change rate.

The change rate event notification rule may include a part of, or all of, a structure shown in Table 1.

TABLE 1

| Notification rule | Multiplicity | Matching condition |
|---|---|---|
| The change rate increases | 0 . . . 1 | The absolute value of the change rate is greater than a threshold, and the change rate is calculated through dividing a change in attribute values of two adjacent instances by time. |
| The change rate decreases | 0 . . . 1 | The absolute value of the change rate is smaller than the threshold |
| Direction of the change rate | 0 . . . 1 | A change direction, including positive change and negative change |

As mentioned above, when the change rate of the content information about the received $N^{th}$ content instance relative to the content information about any content instance before the $N^{th}$ content instance meets the predetermined threshold, it means that a scenario where the IoT device that transmits the data has changed, so a scenario-has-changed event may be generated and scenario information may be carried in the subscribed data. Because the data of the subscription further includes the scenario information, the subscribed data may meet the requirement of some specific applications.

In some embodiments of the present disclosure, the subscription resource may further include a scenario rule, and the scenario rule may be pre-defined in the network side device or acquired from the received subscription request. In a mode where the scenario rule is acquired from the received subscription request, prior to Step S110, the event subscription notification method may further include receiving the subscription request from an application entity, and the subscription request may include the scenario rule defined by the application entity.

In a mode where the subscription resource includes the scenario rule, prior to determining whether the subscribed data meets the event notification rule, the event subscription notification method may further include determining a first scenario in accordance with the scenario rule and determining a first event notification rule in accordance with the first scenario. Correspondingly, the determining whether the subscribed data meets the event notification rule may specifically include determining whether the subscribed data meets the first event notification rule. Through determining the first scenario, it is able to subscribe the data in the first scenario.

In the embodiments of the present disclosure, how to determine the first scenario in accordance with the scenario rule will not be particularly defined. In a possible embodiment of the present disclosure, the determining the first scenario in accordance with the scenario rule may include: acquiring a scenario attribute of the received content information; and determining whether the scenario attribute of the received content information meets the scenario rule.

In the embodiments of the present disclosure, a specific content of the scenario rule will not be particularly defined. For example, when the event subscription notification method is applied to an IoT system, the scenario rule may include at least one of a scenario definition, an environment rule and a road rule.

In some embodiments of the present disclosure, when the scenario rule includes the environment rule, the environment rule may include at least one of a temperature attribute, a humidity attribute, an amount-of-rain attribute and a sunlight intensity attribute. It should be appreciated that, usually an attribute represents some parameters, ranges or rules, and it belongs to a resource. When the resource is achieved through a class of the C++ programming language, the attribute may be achieved through a parameter of the C++ programming language.

In some embodiments of the present disclosure, when the scenario rule includes a road rule, the road rule may include a vehicle information attribute and/or a traffic information attribute. To be specific, the traffic information attribute may include at least one of a direction-of-road attribute, a road pedestrian information attribute, a road non-motorized vehicle information attribute, and road motorized vehicle information attribute. The vehicle information attribute may include at least one of a speed attribute, a number-of-braking-operation attribute, and a windshield wiper sate attribute. For example, Table 2 shows examples of the speed attribute information in different scenarios.

TABLE 2

| Scenario | Speed |
|---|---|
| with sunshine and pedestrians | 80 km/h |
| with sunshine but without pedestrians | 120 km/h |
| with rain and pedestrians | 60 km/h |
| with rain but without pedestrians | 100 km/h |

FIG. 4 shows a specific implementation mode of the subscription resource. In a resource structure as shown in FIG. 4, each rectangular box represents a resource, and each elliptical box represents an attribute. As shown in FIG. 4, at first, a container resource may be created for the IoT device AE1, and a plurality of content instance resources and scenario-based subscription resources may be created in the container resource. The scenario-based subscription resources may include a notification address attribute (notificationURL), a batch notification attribute (batchNotify), a change rate threshold attribute (rateLimit), a notification content type attribute (notificationContentType), a notification event criteria attribute (notificationEventCat), a scenario change rate resource (scenario) or scenario resource, and an event notification criteria reference list resource (eventNotificationCriteriaRefList). The scenario change rate resource may include a scenario change rate definition attribute (scenarioDefinition), an environment criteria attribute (environmentCriteria), and a road criteria attribute (roadCriteria). Further, the environment criteria attribute may include a temperature attribute, a humidity attribute, an amount-of-rain attribute (rainMount), and a sunlight intensity attribute (sunRate). The road criteria attribute may include a number-of-car message attribute (numOfCarMessage), a number-of-pedestrian message attribute (numOfPedestrianMessage), a number-of-rider attribute (numOfRider), and a direction-of-road attribute (directionOfRoad). The event notification criteria reference list resource may include a scenario change rate definition attribute (scenarioDefinition) or a scenario attribute, and an event notification criteria per scenario attribute (eventNotificationCriteriaPerScenario).

Figure 5:
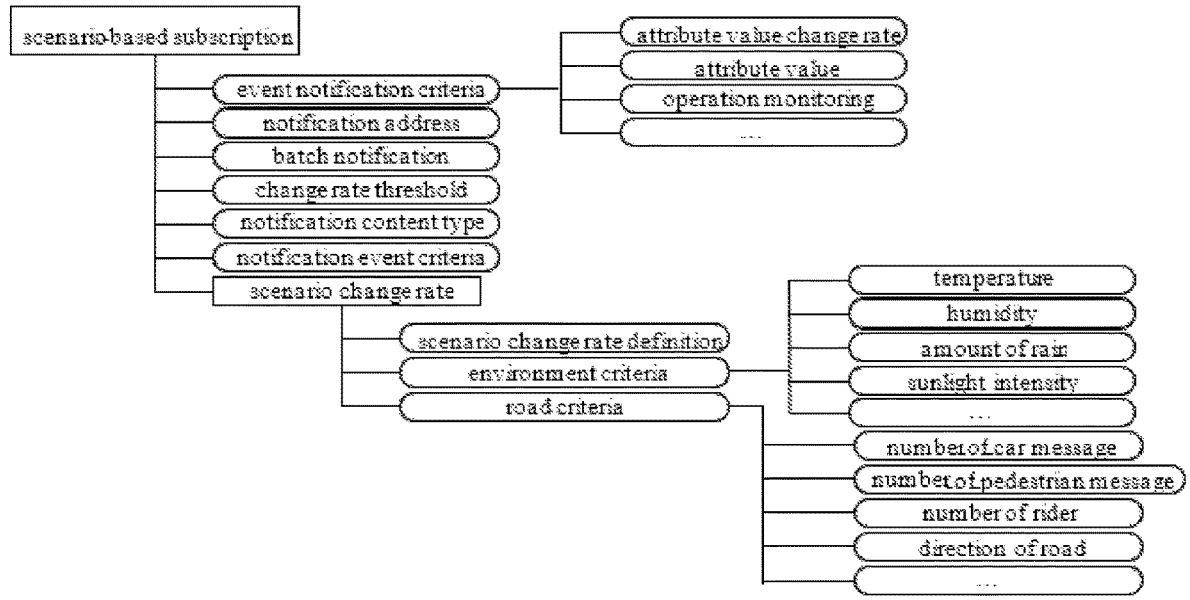
FIG. 5 is a schematic view showing a resource structure (including an environment criteria attribute and a road criteria attribute) of a scenario-based subscription resource according to one embodiment of the present disclosure.

In some embodiments of the present disclosure, the scenarios where the content information has been received may not be differentiated from each other. In order to acquire a change rate of the content information, prior to Step S120, the event subscription notification method may further include creating a content instance resource for the received data in accordance with the content information about the received data. The received data may be data received by the network side device from the IoT device AE1, e.g., real-time information collected by the IoT device AE1. In the embodiments of the present disclosure, a resource structure created in the public service entity is shown in FIG. 5. To be specific, the subscription resource may include an event notification criteria attribute, a notification address attribute, a change rate threshold attribute, a notification content type attribute, a notification event criteria attribute, and a scenario change rate resource. The event notification criteria attribute (eventNotificationCriteria) may include an attribute value change rate attribute (attributevalueChangeRate), an attribute value attribute (attributeValue), and an operation monitoring attribute (operationMonitor).

Figure 6:
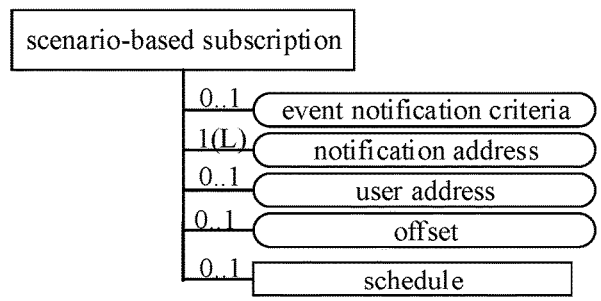
FIG. 6 is a schematic view showing a resource structure of the scenario-based subscription resource (including an offset attribute) according to one embodiment of the present disclosure.

In a possible embodiment of the present disclosure, as shown in FIG. 6, the subscription resource may include an offset attribute, so as to subscribe a change rate of a child resource and/or a grandchild resource of a requested resource. The offset attribute represents a hierarchy of the subscription. For example, when the offset attribute is 0, it means that merely a change in the requested resource is subscribed, when the offset attribute is 1, it means that a change in the child resource of the requested resource is subscribed, and when the offset attribute is 2, it means that a change in the grandchild resource of the requested resource is subscribed. In a possible embodiment of the present disclosure, when the offset attribute is 1, the changes in the requested resource and the child resource of the requested resource may also be subscribed.

As shown in FIG. 6, the subscription resource may further include a schedule attribute.

In some embodiments of the present disclosure, the event notification rule may be stored in the attribute, and such operations as creation, update, acquisition and deletion may be performed upon the receipt of a request.

In addition, prior to Step S110, the event subscription notification method may further include: creating an IoT device resource in accordance with a registration request from the IoT device, and creating an application entity resource in accordance with a registration request from the application entity; transmitting a registration response to the IoT device and transmitting a registration response to the application entity; creating a container resource for the IoT device in accordance with a received container creation request from the IoT device; and transmitting a container resource creation response to the IoT device.

Correspondingly, the subscription resource may be created in the container resource.

Figure 7:
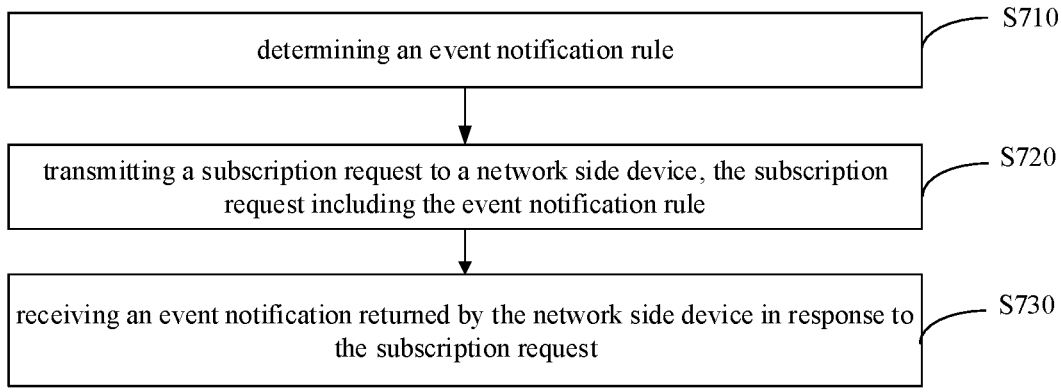
FIG. 7 is a flow chart of an event subscription notification method according to one embodiment of the present disclosure.

In a second aspect, as shown in FIG. 7, the present disclosure further provides in some embodiments an event subscription notification method for an application entity, which includes: Step S710 of determining an event notification rule; Step S720 of transmitting a subscription request to a network side device, the subscription request including the event notification rule; and Step S730 of receiving an event notification returned by the network side device in response to the subscription request.

A specific content of the event notification rule in the above steps may refer to relevant description mentioned hereinabove. The event notification in Step S730 may include subscribed data meeting the event notification rule. In Step S730, the event notification returned by the network side device in response to the subscription request may be generated by the network side device in such a way as mentioned hereinabove.

In a third aspect, as shown in FIG. 8, the present disclosure further provides in some embodiments a network side device 100, which includes a determination circuitry 110, a resource creation circuitry 120 and an even generation circuitry 130.

The resource creation circuitry 120 is configured to create a subscription resource, and the subscription resource may include an event notification rule.

The determination circuitry 110 is configured to determine whether subscribed data meets the event notification rule.

The event generation circuitry 130 is configured to, when the determination circuitry determines that the subscribed data meets the event notification rule, generate an event notification.

The network side device 100 in the embodiments of the present disclosure is used to implement the above-mentioned event subscription notification method in FIG. 3. An operating principle and a beneficial effect of the event subscription notification method have been described in details hereinabove, and thus will not be particularly defined herein.

In some embodiments of the present disclosure, the event notification rule may include one or more of a change rate event notification rule, an attribute change rule and an operation monitoring rule.

In some embodiments of the present disclosure, the change rate event notification rule may include whether a change rate of content information about a received $N^{th}$ content instance relative to content information about at least one content instance in a first content instance to an $(N-1)^{th}$ content instance meets a predetermined threshold, where N is a variable and a natural number not smaller than 2.

Correspondingly, the determination circuitry 110 is specifically configured to determine whether the change rate of the content information about the received $N^{th}$ content instance relative to the content information about the at least one content instance in the first content instance to the $(N-1)^{th}$ content instance meets the predetermined threshold, and when the change rate of the content information about the received $N^{th}$ content instance relative to the content information about the at least one content instance in the first content instance to the $(N-1)^{th}$ content instance meets the predetermined threshold, determine that the subscribed data meets the event notification rule.

In some embodiments of the present disclosure, the network side device 100 may further include a scenario determination circuitry configured to determine a first scenario in accordance with a scenario rule and determine a first event notification rule in accordance with the first scenario. The determination circuitry is specifically configured to determine whether the subscribed data meets the first event notification rule in accordance with the first event notification rule.

In some embodiments of the present disclosure, the resource creation circuitry 120 is further configured to create the subscription resource upon the receipt of a subscription request, and the subscription resource may include the scenario rule. The determination circuitry 110 is further configured to, prior to determining whether the subscribed data meets the event notification rule, determine whether the subscribed data meets the scenario rule, and when the subscribed data meets the scenario rule, determine whether the subscribed data meets the event notification rule.

In some embodiments of the present disclosure, the resource creation circuitry 120 is further configured to create a content instance resource for the received data in accordance with content information about the received data.

In some embodiments of the present disclosure, the network side device 100 may further include a registration circuitry configured to register an IoT device AE1 in in accordance with a registration request from the IoT device AE1, and transmit a registration response. The resource creation circuitry 120 is further configured to create a corresponding IoT device resource <AE1> for the IoT device AE1. The registration circuitry is further configured to register an application entity AE2 in accordance with a registration request from the application entity AE2, and transmit a registration response. The resource creation circuitry 120 is further configured to create a corresponding application entity resource <AE2> for the application entity AE2.

In some embodiments of the present disclosure, the resource creation circuitry 120 is further configured, upon the receipt of a container creation request from the IoT device AE1, create a corresponding container resource <AE1>/<container resource>, and transit a corresponding container creation response. It should be appreciated that, "/" represents a dividing line between a parent resource and a child resource, where a resource before "/" is the parent resource and a resource after "I" is the child resource.

In some embodiments of the present disclosure, the resource creation circuitry 120 is further configured to, subsequent to creating the subscription resource, transmit a subscription response to the application entity.

Figure 9:
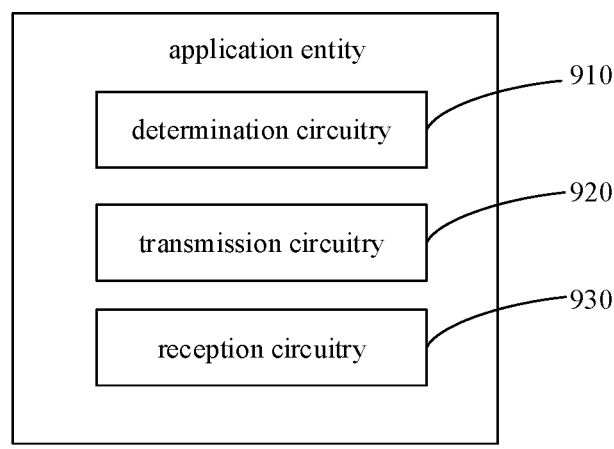
FIG. 9 is a schematic view showing an application entity according to one embodiment of the present disclosure.

In a fourth aspect, as shown in FIG. 9, the present disclosure further provides in some embodiments an application entity, which includes a determination circuitry 910, a transmission circuitry 920 and a reception circuitry 930.

The determination circuitry 910 is configured to determine an event notification rule.

The transmission circuitry 920 is configured to transmit a subscription request to a network side device, and the subscription request may include the event notification rule.

The reception circuitry 930 is configured to receive an event notification returned by the network side device in response to the subscription request.

A specific content of the event notification rule may refer to the relevant description hereinabove. The event notification received by the reception circuitry 930 may include subscribed data meeting the event notification rule. The event notification received by the reception circuitry 930 may be generated by the network side device in such a way as mentioned hereinabove.

In a fifth aspect, as shown in FIG. 8, the present disclosure further provides in some embodiments an IoT system, which includes a network side device, at least one IoT device AE1 and an application entity AE2. The network side device may be the network side device 100 mentioned hereinabove, the IoT device AE1 may be the IoT device AE1 mentioned hereinabove, and the application entity AE2 may be the application entity AE2 mentioned hereinabove too. The IoT device AE1 and the application entity AE2 may be in communication with the network side device 100. Several operating modes of the IoT system will be described illustratively hereinafter.

Figure 10:
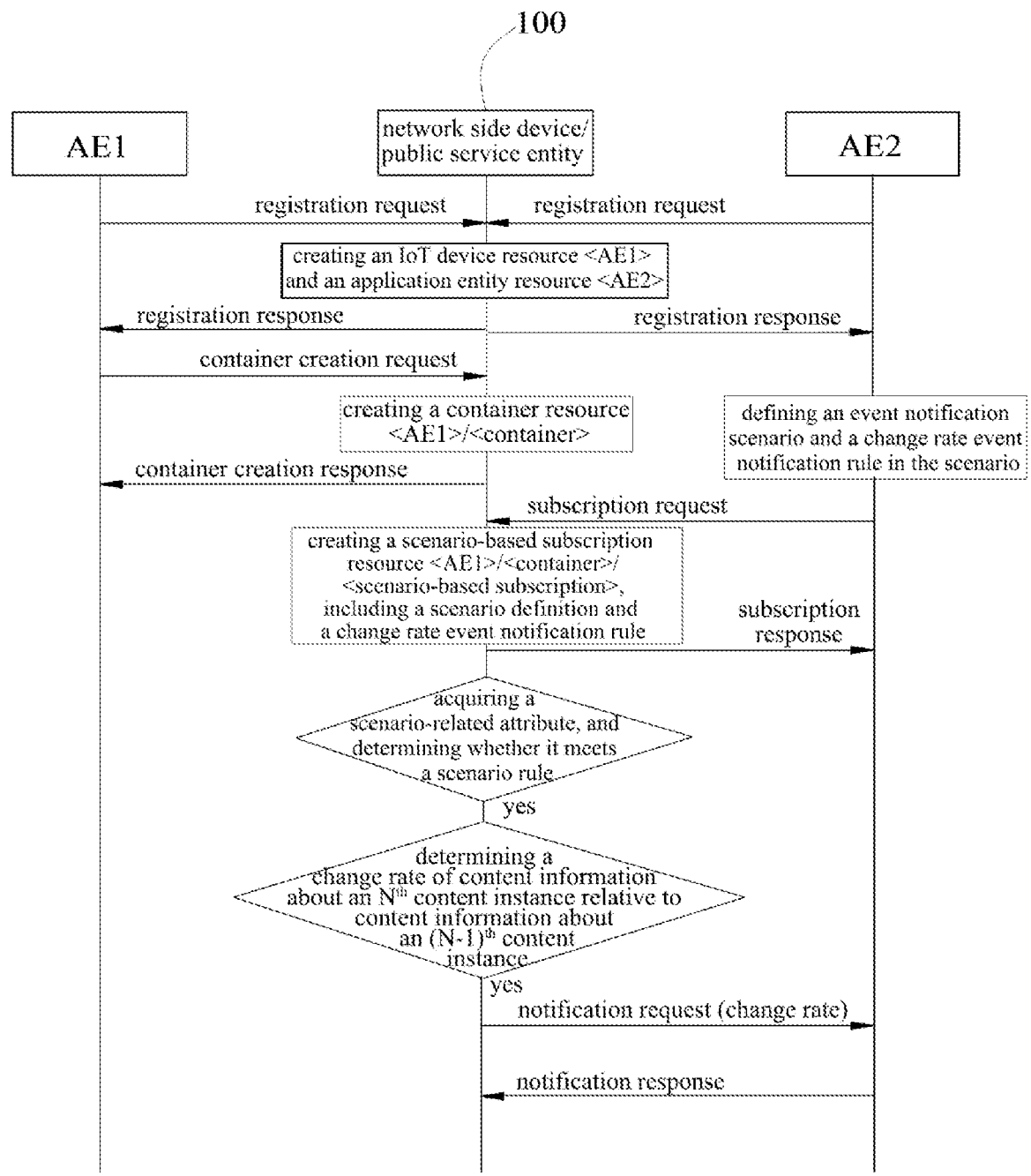
FIG. 10 is a flow chart of the event subscription notification method implemented by the IoT system according to one embodiment of the present disclosure.

FIG. 10 is a flow chart of the event subscription notification method implemented by the IoT system according to one embodiment of the present disclosure. As shown in FIG. 10, the event subscription notification method may include the following steps.

The IoT device AE1 and the application entity AE2 may each transmit a registration request to the network side device 100.

The resource creation circuitry of the network side device 100 may create the IoT device resource <AE1> for the IoT device AE1 and the application entity resource <AE2> for the application entity AE2.

After the creation of the IoT device resource <AE1> for the IoT device AE1 and the application entity resource <AE2> for the application entity AE2, the network side device 100 may transmit a registration response to each of the IoT AE1 and the application entity AE2.

Upon the receipt of the registration response, the IoT device AE1 may transmit a container creation request to the network side device 100.

Upon the receipt of the container creation request, the resource creation circuitry of the network side device 100 may create a container resource <AE1>/<container resource> for the IoT device AE1, and transmit a container creation response to the IoT device AE1.

The application entity AE2 may define an event notification scenario and a change rate event notification rule in the event notification scenario, and transmit a subscription request to the network side device 100.

Upon the receipt of the subscription request from the application entity AE2, the resource creation circuitry of the network side device 100 may create a scenario-based subscription resource <AE2>/<container resource>/<scenario-based subscription resource> in the container resource, and transmit a subscription response to the application entity AE2. The subscription resource may include a scenario definition and the change rate event notification rule.

The determination circuitry of the network side device 100 may determine whether a scenario attribute of the received content information meets a scenario defined with the scenario definition attribute.

When a determination result of the determination circuitry is yes, the determination circuitry of the network side device 100 may determine whether a change rate of content information about a received $N^{th}$ content instance relative to at least one content instance in a first content instance to an $(N-1)^{th}$ content instance meets a predetermined threshold.

When a determination result of the determination circuitry is yes, a notification request may be transmitted to the application entity AE2 (i.e., an event may be generated).

Upon the receipt of the notification request, the application entity AE2 may transmit a notification response to the network side device 100.

In a possible embodiment of the present disclosure, the transmitting the notification request to the application entity AE2 (i.e., generating the event) may include transmitting, by the network side device 100, the received content information to the application entity AE1 via a wireless network. The content information received by the network side device 100 may be real-time information collected by the IoT device AE1 and reported to the network side device.

Figure 11:
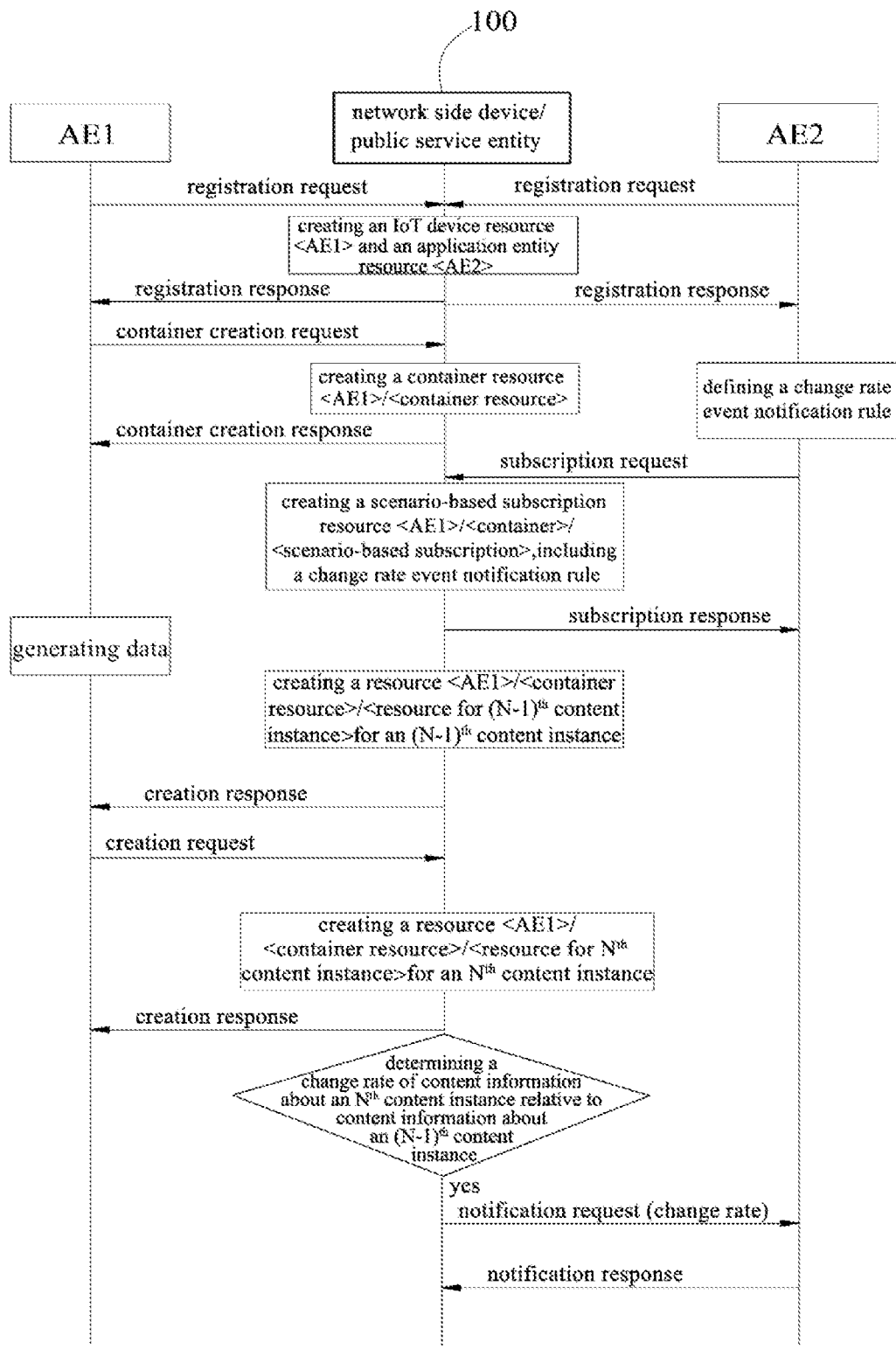
FIG. 11 is another flow chart of the event subscription notification method implemented by the IoT system according to one embodiment of the present disclosure.

FIG. 11 is another flow chart of the event subscription notification method implemented by the IoT system according to one embodiment of the present disclosure. As shown in FIG. 11, the event subscription notification method may include the following steps.

The IoT device AE1 and the application entity AE2 may each transmit a registration request to the network side device 100.

The resource creation circuitry of the network side device 100 may create the IoT device resource <AE1> for the IoT device AE1 and the application entity resource <AE2> for the application entity AE2.

After the creation of the IoT device resource <AE1> for the IoT device AE1 and the application entity resource <AE2> for the application entity AE2, the network side device 100 may transmit a registration response to each of the IoT AE1 and the application entity AE2.

Upon the receipt of the registration response, the IoT device AE1 may transmit a container creation request to the network side device 100.

Upon the receipt of the container creation request, the resource creation circuitry of the network side device 100 may create a container resource <AE1>/< container resource> for the IoT device AE1, and transmit a container creation response to the IoT device AE1.

The application entity AE2 may define an event notification scenario and a change rate event notification rule in the event notification scenario, and transmit a subscription request to the network side device 100.

Upon the receipt of the subscription request from the application entity AE2, the resource creation circuitry of the network side device 100 may create a scenario-based subscription resource <AE2>/<container resource>/<scenario-based subscription resource> in the container resource, and transmit a subscription response to the application entity AE2. The subscription resource may include a scenario definition and the change rate event notification rule.

The IoT device AE1 may transmit a collected $(N-1)^{th}$ content instance to the network side device 100. The resource creation circuitry of the network side device 100 may create a resource <AE1>/<container resource>/<resource for the $(N-1)^{th}$ content instance> for the $(N-1)^{th}$ content instance, and transmit a creation response to the IoT device AE1.

Upon the receipt of the creation response, the IoT device AE1 may continue to transmit a collected $N^{th}$ content instance to the network side device 100. The resource creation circuitry of the network side device 100 may create a resource <AE1>/<container resource>/<resource for the $N^{th}$ content instance> for the $N^{th}$ content instance, and transmit a creation response to the IoT device AE1.

The determination circuitry of the network side device 100 may determine whether a change rate of content information about the received $N^{th}$ content instance relative to content information about at least one content instance in a first content instance to the $(N-1)^{th}$ content instance meets a predetermined threshold.

When a determination result of the determination circuitry is yes, a notification request may be transmitted to the application entity AE2 (i.e., an event may be generated).

Upon the receipt of the notification request, the application entity AE2 may transmit a notification response to the network side device 100.

In a sixth aspect, the present disclosure further provides in some embodiments a computer-readable storage medium storing therein an instruction, and the instruction is executed by a processor so as to implement the above-mentioned event subscription notification method.

It should be appreciated that, the embodiments of the present disclosure may be implemented by hardware, software, firmware, middleware, microcode or a combination thereof. For the hardware implementation, the processor may be implemented in one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments have been described in a progressive manner, and the same or similar contents in the embodiments have not been repeated, i.e., each embodiment has merely focused on the difference from the others. For the description of same or similar parts between various embodiments, a cross-reference may be made to the embodiments.

It should be appreciated that, the present disclosure may be provided as a method, a device or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, compact disc-read only memory (Compact Disc-Read Only Memory, CD-ROM) and optical memory) including computer-readable program codes.

The present disclosure has been described with reference to the flow charts and/or block diagrams of the method, device (system) and computer program product according to the embodiments of the present disclosure. It should be appreciated that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An event subscription notification method for a network side device of an Internet of Vehicle (IoV) system, comprising:
   creating a subscription resource, the subscription resource comprising an event notification rule;
   determining whether subscribed data meets the event notification rule; and
   when the subscribed data meets the event notification rule, generating an event notification;
   wherein the subscription resource further comprises a scenario rule, wherein the scenario rule comprises an environment rule and a road rule; wherein the environment rule comprises at least one of a temperature attribute, a humidity attribute, an amount-of-rain attribute and a sunlight intensity attribute; wherein the road rule comprises a vehicle information attribute and a traffic information attribute;
   wherein the event subscription notification method further comprises determining a first scenario where an IoV device in a vehicle is located in accordance with the scenario rule and determining a first event notification rule in accordance with the first scenario; wherein first event notification rules in different first scenarios have different contents;
   wherein the determining the subscribed data meets the event notification rule comprises determining whether the subscribed data meets the first event notification rule;
   wherein the first event notification rule comprises a change rate event notification rule, and the change rate event notification rule comprises whether a change rate of content information about a received $N^{th}$ content instance relative to content information about at least one content instance in a first content instance to an $(N-1)^{th}$ content instance meets a predetermined threshold, where N is a variable and a natural number not smaller than 2, wherein different first scenarios corresponds to different predetermined thresholds, respectively;
   wherein the determining whether the subscribed data meets the first event notification rule comprises: determining whether the change rate of the content information about the received $N^{th}$ content instance relative to the content information about the at least one content instance in the first content instance to the $(N-1)^{th}$ content instance meets the predetermined threshold; and when the change rate of the content information about the $N^{th}$ content instance relative to the content information about any content instance before the $N^{th}$ content instance meets the predetermined threshold, determining that the content information about the $N^{th}$ content instance meets the change rate event notification rule.

2. The event subscription notification method according to claim 1, wherein the event notification rule further comprises one or more of an attribute change event notification rule, and an operation monitoring event notification rule.

3. The event subscription notification rule according to claim 1, wherein when the change rate meets the predetermined threshold, an absolute value of the change rate is greater than the predetermined threshold and the change rate is a positive change rate or a negative change rate; and/or the absolute value of the change rate is smaller than the predetermined threshold and the change rate is a positive change rate or a negative change rate.

4. The event subscription notification method according to claim 1, wherein the scenario rule further comprises a scenario definition.

5. The event subscription notification method according to claim 1, wherein the subscription resource further comprises an offset attribute for subscribing a change rate of a child resource and/or a grandchild resource of a requested resource.

6. The event subscription notification method according to claim 1, wherein prior to determining whether the subscribed data meets the event notification rule, the event subscription notification method further comprises creating a content instance resource for received data in accordance with content information about the received data.

7. The event subscription notification method according to claim 1, wherein the vehicle information attribute comprises at least one of a speed attribute, a number-of-braking-operation attribute, and a windshield wiper sate attribute;
   wherein the first content instance to the Nth content instance correspond to a same one parameter of the vehicle information attribute of the IoV device in the vehicle.

8. A non-transitory computer-readable storage medium storing therein an instruction for implementing the event subscription notification method according to claim 1.

9. The non-transitory computer-readable storage medium according to claim 8, wherein the scenario rule comprises a scenario definition.

10. The non-transitory computer-readable storage medium according to claim 8, wherein the subscription resource further comprises an offset attribute for subscribing a change rate of a child resource and/or a grandchild resource of a requested resource.

11. An event subscription notification method for an Internet of Vehicle (IoV) device of an IoV system, comprising:
   determining an event notification rule;
   transmitting a subscription request to a network side device, the subscription request comprising the event notification rule; and
   receiving an event notification returned by the network side device in response to the subscription request;
   wherein the event notification comprises subscribed data meeting the event notification rule;
   wherein the event notification comprises subscribed data meeting a first event notification rule; wherein the first event notification rule is determined in accordance with a first scenario where the IoV device of a vehicle is located, the first scenario is determined in accordance with a scenario rule comprised in the subscription resource; wherein the scenario rule comprises an environment rule and a road rule; wherein the environment rule comprises at least one of a temperature attribute, a humidity attribute, an amount-of-rain attribute and a sunlight intensity attribute; wherein the road rule comprises a vehicle information attribute and a traffic information attribute; wherein first event notification rules in different first scenarios have different contents;

wherein the first event notification rule comprises a change rate event notification rule, and the change rate event notification rule comprises whether a change rate of content information about a $N^{th}$ content instance received by the network side device relative to content information about at least one content instance in a first content instance to an $(N-1)^{th}$ content instance meets a predetermined threshold, where N is a variable and a natural number not smaller than 2, wherein different first scenarios corresponds to different predetermined thresholds, respectively;

wherein the subscribed data meeting the first event notification rule comprises: the change rate of the content information about the $N^{th}$ content instance received by the network side device relative to the content information about the at least one content instance in the first content instance to the $(N-1)^{th}$ content instance meets the predetermined threshold.

12. A non-transitory computer-readable storage medium storing therein an instruction for implementing the event subscription notification method according to claim 11.

13. A network side device of an Internet of Vehicle (IoV) system, comprising:
 a resource creation circuitry configured to create a subscription resource, the subscription resource comprising an event notification rule;
 a determination circuitry configured to determine whether subscribed data meets the event notification rule; and
 an event generation circuitry configured to, when the determination circuitry determines that the subscribed data meets the event notification rule, generate an event notification;
 wherein the subscription resource further comprises a scenario rule, wherein the scenario rule comprises an environment rule and a road rule; wherein the environment rule comprises at least one of a temperature attribute, a humidity attribute, an amount-of-rain attribute and a sunlight intensity attribute; wherein the road rule comprises a vehicle information attribute and a traffic information attribute;
 wherein the network side device further comprises a scenario determination circuitry configured to determine a first scenario where an IoV device in a vehicle is located in accordance with the scenario rule and determine a first event notification rule in accordance with the first scenario, and the determination circuitry is further configured to determine whether the subscribed data meets the first event notification rule in accordance with the first event notification rule;
 wherein first event notification rules in different first scenarios have different contents;
 wherein the first event notification rule comprises a change rate event notification rule, and the change rate event notification rule comprises whether a change rate of content information about a received $N^{th}$ content instance relative to content information about at least one content instance in a first content instance to an $(N-1)^{th}$ content instance meets a predetermined threshold, where N is a variable and a natural number not smaller than 2, wherein different first scenarios corresponds to different predetermined thresholds, respectively;
 wherein the determination circuitry is further configured to determine whether the change rate of the content information about the received $N^{th}$ content instance relative to the content information about the at least one content instance in the first content instance to the $(N-1)^{th}$ content instance meets the predetermined threshold, and when the change rate of the content information about the received $N^{th}$ content instance relative to the content information about the at least one content instance in the first content instance to the $(N-1)^{th}$ content instance meets the predetermined threshold, determine that the subscribed data meets the event notification rule.

14. The network side device according to claim 13, wherein the event notification rule further comprises one or more of an attribute change event notification rule, and an operation monitoring event notification rule.

15. The network side device according to claim 13, wherein when the change rate meets the predetermined threshold, an absolute value of the change rate is greater than the predetermined threshold and the change rate is a positive change rate or negative change rate; and/or the absolute value of the change rate is smaller than the predetermined threshold and the change rate is a positive change rate or negative change rate.

16. The network side device according to claim 13, wherein the scenario rule further comprises a scenario definition.

17. The network side device according to claim 13, wherein the resource creation circuitry is further configured to create a content instance resource for received data in accordance with content information about the received data.

18. The network side device according to claim 13, wherein the vehicle information attribute comprises at least one of a speed attribute, a number-of-braking-operation attribute, and a windshield wiper sate attribute;
 wherein the first content instance to the Nth content instance correspond to a same one parameter of the vehicle information attribute of the IoV device in the vehicle.

* * * * *